United States Patent
Tedesco et al.

(10) Patent No.: US 9,916,059 B2
(45) Date of Patent: Mar. 13, 2018

(54) APPLICATION LAUNCHER SIZING

(71) Applicant: Microsoft Technology Licensing, LLC, Redmond, WA (US)

(72) Inventors: Megan L. Tedesco, Sammamish, WA (US); Anshul Rawat, Kirkland, WA (US); Henri-Charles Machalani, Seattle, WA (US); Chaitanya Dev Sareen, Seattle, WA (US); Jaclyn C. Knapp, Redmond, WA (US); Matthew N. Akers, Lynnwood, WA (US); Poorva Singal, Redmond, WA (US); Jeff G. Arnold, Sammamish, WA (US); Brian E. Uphoff, Seattle, WA (US); Richard Jennings Duncan, Bellevue, WA (US); Miron Vranjes, Seattle, WA (US); Christopher Doan, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 749 days.

(21) Appl. No.: 14/448,716

(22) Filed: Jul. 31, 2014

(65) Prior Publication Data
US 2016/0034154 A1 Feb. 4, 2016

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/0482* (2013.01); *G06F 3/0485* (2013.01);
(Continued)

(58) Field of Classification Search
CPC .... G06F 3/0482; G06F 3/0485; G06F 3/0486; G06F 9/4443; G06F 9/445
(Continued)

(56) References Cited

U.S. PATENT DOCUMENTS 7,392,483 B2 6/2008 Wong et al.
8,255,411 B1* 8/2012 Carpenter ........... G06F 17/3064
707/764
(Continued)

FOREIGN PATENT DOCUMENTS

WO 2013010154 A2 1/2013

OTHER PUBLICATIONS

"International Preliminary Report on Patentability Issued in PCT Application No. PCT/US2015/042341", dated Sep. 8, 2016, 9 Pages.
(Continued)

*Primary Examiner* — David Phantana Angkool
(74) *Attorney, Agent, or Firm* — Klarquist Sparkman, LLP (57) ABSTRACT

Application launcher sizing techniques are described. In one or more implementations, a likely usage context is determined, by a computing device, of a user in interacting with the computing device. An application launcher is dynamically sized within a display area of the user interface by the computing device based on the determined likely usage context of the user. The application launcher is configured for output responsive to an input received from a user and includes a plurality of representations of applications that are selectable to navigate to a user interface corresponding with a respective said application.

19 Claims, 10 Drawing Sheets

(51) Int. Cl.
  *G06F 9/44*    (2018.01)
  *G06F 3/0482*  (2013.01)
  *G06F 3/0485*  (2013.01)
  *G06F 3/0486*  (2013.01)
  *G06F 9/445*   (2018.01)

(52) U.S. Cl.
  CPC ............ *G06F 3/0486* (2013.01); *G06F 9/445* (2013.01); *G06F 9/4443* (2013.01); *G06F 2203/04803* (2013.01)

(58) Field of Classification Search
  USPC .......................................................... 715/789
  See application file for complete search history.

(56) References Cited

U.S. PATENT DOCUMENTS

| | | | |
|---|---|---|---|
| 8,464,172 | B2 | 6/2013 | Chaudhri et al. |
| 8,494,590 | B2* | 7/2013 | Sheldon ........... H04N 21/41407 455/158.4 |
| 9,032,321 | B1* | 5/2015 | Cohen .................. G06F 3/0484 715/771 |
| 9,124,545 | B2* | 9/2015 | St. Clair ................. H04L 51/32 |
| 9,501,297 | B2* | 11/2016 | Bauchot .................. G06F 9/445 |
| 9,513,783 | B1* | 12/2016 | Vaidya .................. G06F 9/4443 |
| 9,531,601 | B2* | 12/2016 | Kim ....................... H04L 67/125 |
| 9,557,889 | B2* | 1/2017 | Raleigh ................. G06F 3/0482 |
| 2008/0134220 | A1 | 6/2008 | Weiss et al. |
| 2012/0015693 | A1* | 1/2012 | Choi ................ H04M 1/72566 455/566 |
| 2012/0204131 | A1 | 8/2012 | Hoang et al. |
| 2013/0019172 | A1 | 1/2013 | Kotler et al. |
| 2013/0080890 | A1 | 3/2013 | Krishnamurthi |
| 2013/0346347 | A1* | 12/2013 | Patterson ............. G06N 99/005 706/12 |
| 2013/0346408 | A1* | 12/2013 | Duarte .............. G06F 17/30598 707/737 |
| 2014/0068501 | A1 | 3/2014 | Wu et al. |
| 2014/0201655 | A1* | 7/2014 | Mahaffey ............ G06F 3/04817 715/765 |
| 2017/0085678 | A1* | 3/2017 | Babu ...................... G06Q 10/10 |
| 2017/0097743 | A1* | 4/2017 | Hameed ................ G06F 3/0482 |

OTHER PUBLICATIONS

"Super Huge Guide for CyanogenMod 10.1", Published on: Jul. 27, 2013, Available at: http://www.reddit.com/r/Android/comments/1iewqg/super_huge_guide_for_cyanogenmod_101/, 17 pages.

Thurrott, Paul, "Start Menu Will Replace Start Screen in Threshold", Published on: Jul. 1, 2014, Available at: http://winsupersite.com/windows-8/start-menu-will-replace-start-screen-threshold, 10 pages.

"Microsoft Should Stick to its Guns and Keep the Start Button Gone" Published on: May 31, 2013 Available at: http://arstechnica.com/civis/viewtopic.php?p=24599167, 19 pages.

Pareit, Pieter, "Immersive Full-Screen Mode", Published on: Apr. 14, 2014, Available at: https://play.google.com/store/apps/details?id=be.ppareit.immersivemode&hl=en, 3 pages.

Second Written Opinion of the International Preliminary Examining Authority, International Application No. PCT/US2015/042341, 8 pages, dated Jul. 12, 2016.

Ito, et al., "Application Push & Play—Proposal on Dynamic Execution Environment Combined with Personal Devices and Cloud Computing", In International Journal of Informatics Society, vol. 4, No. 3, Dec. 1, 2012, pp. 135-142.

"International Search Report & Written Opinion Issued in PCT Application No. PCT/US2015/042341", dated Jan. 18, 2016, 19 Pages.

* cited by examiner

APPLICATION LAUNCHER SIZING

BACKGROUND

Computing devices were conventionally configured in a variety of specific ways to support different user interactions with the computing device tailored for particular settings. The computing device, for instance, may be configured to support mobile usage and therefore was optimized for that usage, such as by including a battery, portable size, and user interface configured for interaction by one or more hands of a user. Likewise, the computing device may be configured for non-mobile applications, such as a traditional desktop PC that has a relatively large size and includes devices that are configured to aid user interaction in a desktop setting, such as keyboards and cursor-control devices.

Computing devices are also now available that support use in a variety of settings and consequently may support interaction in a variety of usage scenarios. Examples of such computing devices may include tablets and other configurations that include significant computational resources that make these devices suitable to perform a variety of different interactions. However, conventional techniques typically limited a user to user interactions that were tailored for a single setting and corresponding usage scenario, and thus could limit interaction with the device when used in other settings.

SUMMARY

Application launcher sizing techniques are described. In one or more implementations, a likely usage context is determined, by a computing device, of a user in interacting with the computing device. An application launcher is dynamically sized within a display area of the user interface by the computing device based on the determined likely usage context of the user. The application launcher is configured for output responsive to an input received from a user and includes a plurality of representations of applications that are selectable to navigate to a user interface corresponding with a respective application.

In one or more implementations, a computing device includes a display device having an available display area to display a user interface and one or more modules implemented at least partially in hardware. The one or more modules are configured to expose an application launcher that is dynamically resizable in both horizontal and vertical directions within the available display area of the display device and includes a plurality of representations of applications that are selectable to navigate to a user interface corresponding with a respective application.

In one or more implementations, a computing device includes a display device, a processing system, and memory configured to maintain an operating system that is executable by the processing system to cause output of an application launcher on the display device. The operating system is configured to cause a switch between a consumptive mode of the application launcher and a productive mode of the application launcher responsive to determining a likely usage context of a user in interacting with the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques to interact with a computing device are typically optimized for a single usage scenario, such as to support mobile operation by a mobile computing device. Consequently these techniques did not address the ever increasing range of functionality that is now being made available via these computing devices.

Application launcher sizing techniques are described. In one or more implementations, an application launcher is configured to support dynamic sizing, which may be utilized to support a wide range of functionality. Continuing with the above discussion, for instance, a computing device may make a determination of a likely usage context of a user in interacting with the device, such as whether in a consumptive context optimized for handheld interaction or a productive context optimized for interaction with peripheral devices, e.g., cursor control devices and keyboards. This determination may be made in a variety of other ways as further described in relation to FIG. 9.

Regardless of how the determination is made, the determination may then be used as a basis to dynamically configure functionality of the computing device, such as to dynamically size an application launcher. The application launcher, for instance, may assume a full screen mode having large representations of applications in a consumptive mode to support selection using a user's hand and a smaller overall view also having smaller representations that are selectable using a cursor control device.

The application launcher may also be dynamically sizable in a variety of other ways. For instance, a user may specify addition or removal of representations of applications within an application launcher, such as to pin or unpin tiles representing an application. The computing device may then dynamically resize the application launcher in horizontal and/or vertical directions. Further, a user may also manually specify a size of the application launcher, such as to specify a number of rows or columns, "drag and drop" a border of the application launcher, and so on. The computing device may then "respect this size," such that once the specified size is full additional representations may be accessed through continuous scrolling within the application launcher. Additional functionality is also contemplated, such as to base a size on other application launchers, with which, a user has interacted, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
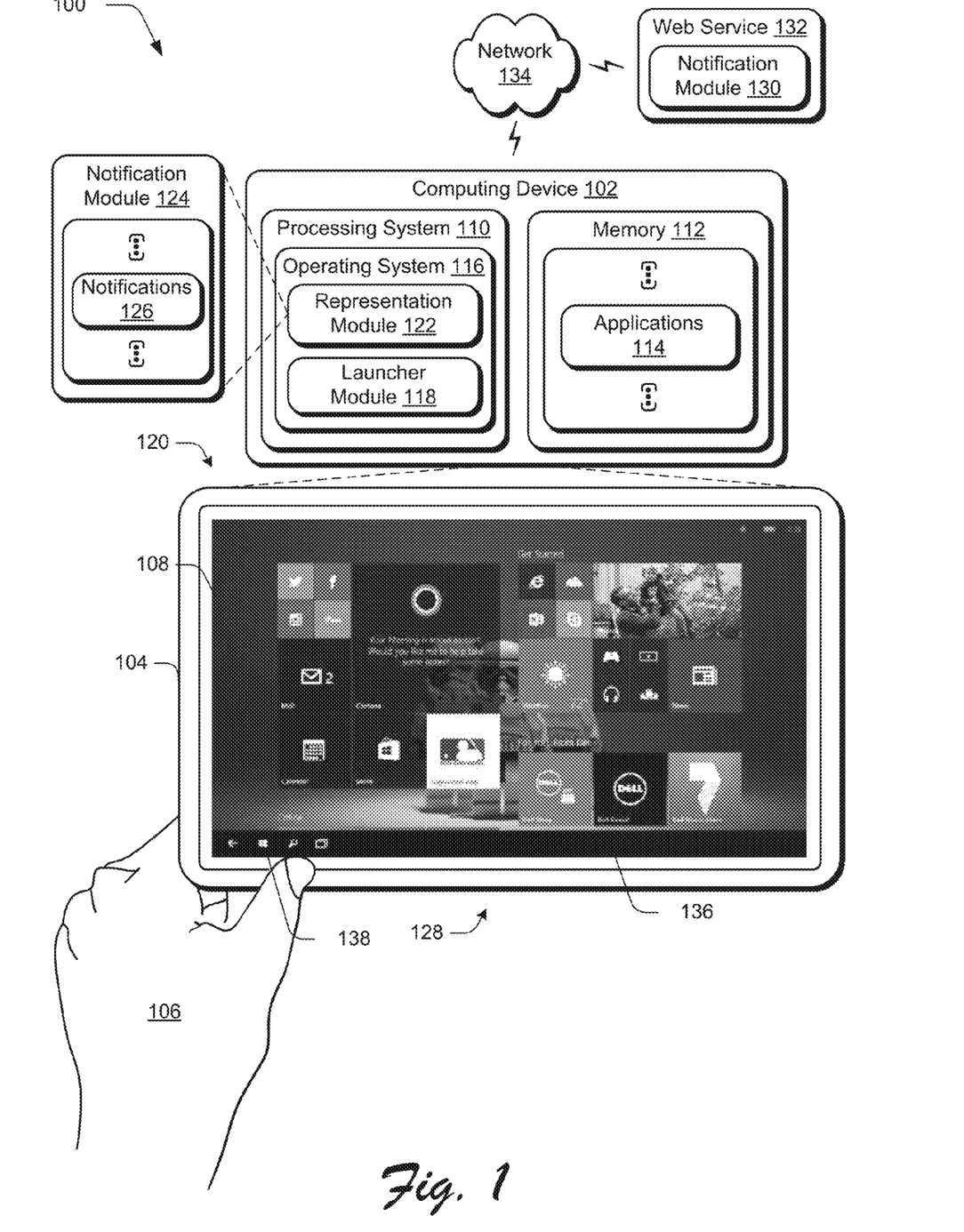
FIG. 1 depicts an environment in an example implementation that is configured to perform application launcher sizing techniques described herein.

FIG. 1 is an illustration of an environment 100 in an example implementation that is operable to employ the application launcher sizing techniques described herein. The illustrated environment 100 includes an example of a computing device 102, which is illustrated as a mobile computing device (e.g., tablet or mobile phone) having a housing 104 that is configured to be held by one or more hands 106 of a user. A variety of other configurations of the computing device 102 are also contemplated.

Figure 12:
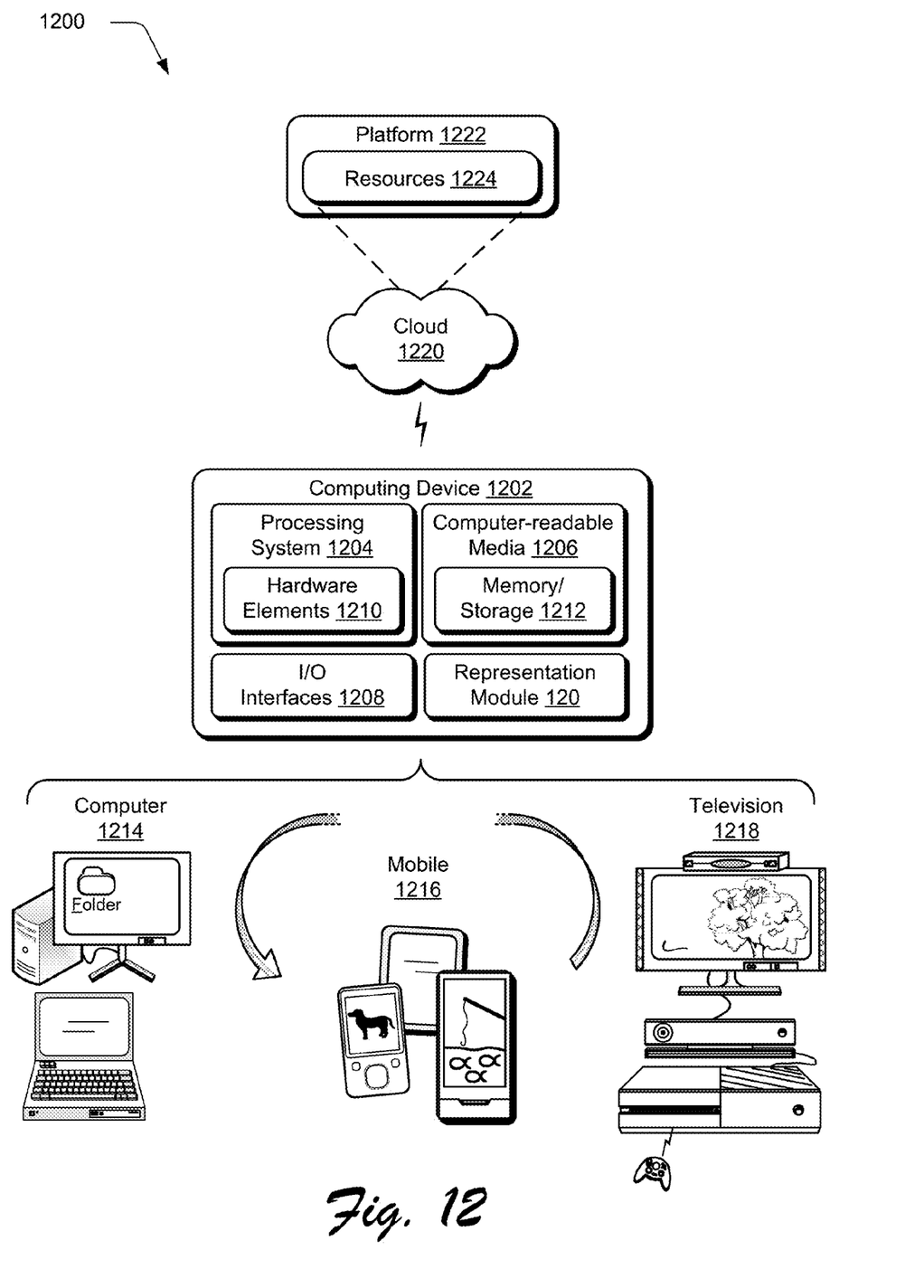
FIG. 12 illustrates various components of an example device that can be implemented as any type of computing device as described with reference to FIGS. 1-11 to implement embodiments of the techniques described herein.

For example, the computing device 102 may be configured as a traditional computer (e.g., a desktop personal computer, laptop computer, and so on), a mobile station, an entertainment appliance, a wireless phone, a tablet, a netbook, and so forth as further described in relation to FIG. 12. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including a display device 108, a processing system 110, and an example of computer-readable storage media, which in this instance is memory 112. The memory 112 is configured to maintain applications 114 that are executable by the processing system 110 to perform one or more operations.

The processing system 110 is not limited by the materials from which it is formed or the processing mechanisms employed therein. For example, the processing system 110 may be comprised of semiconductor(s) and/or transistors (e.g., electronic integrated circuits (ICs)), such as a system on a chip, processors, central processing units, processing cores, functional blocks, and so on. In such a context, executable instructions may be electronically-executable instructions. Alternatively, the mechanisms of or for processing system 110, and thus of or for a computing device, may include, but are not limited to, quantum computing, optical computing, mechanical computing (e.g., using nanotechnology), and so forth. Additionally, although a single memory 112 is shown, a wide variety of types and combinations of memory may be employed, such as random access memory (RAM), hard disk memory, removable medium memory, and other types of computer-readable media.

The computing device 102 is further illustrated as including an operating system 116. The operating system 116 is configured to abstract underlying functionality of the computing device 102 to applications 114 that are executable on the computing device 102. For example, the operating system 116 may abstract the processing system 119, memory 112, network, input/output, and/or display functionality of the display device 108, and so on such that the applications 114 may be written without knowing "how" this underlying functionality is implemented. The application 114, for instance, may provide data to the operating system 116 to be rendered and displayed by the display device 104 without understanding how this rendering will be performed. The operating system 116 may also represent a variety of other functionality, such as to manage a file system and user interface that is navigable by a user of the computing device 102.

The operating system 116 may be configured to process a variety of different input/output functionality supported by the computing device 102. Thus, the operating system 116 include functionality relating to recognition of inputs and/or provision of outputs by the computing device 102 as well as devices used to detect those inputs. For example, the operating system 116 may be configured to identify gestures and cause operations to be performed that correspond to the gestures, and so on. The inputs may be detected for processing by the operating system 110 in a variety of different ways.

For example, the operating system 110 may be configured to receive one or more inputs via touch interaction with a hardware device, e.g., fingers of the user's hand 106 detected using touchscreen functionality of the display device 108. Recognition of the touch inputs may be leveraged by the operating system 116 to interact with a user interface output by the computing device 102, such as to interact with a game, an application, browse the internet, change one or more settings of the computing device 102, and so forth. A variety of other hardware devices are also contemplated that do not involve touch interaction with the display device 104. Examples of such hardware devices include a cursor control device (e.g., a mouse), a remote control (e.g. a television remote control), a mobile communication device (e.g., a wireless phone configured to control one or more operations of the computing device 102), and other devices.

The operating system 116 may also represent a variety of other functionality, such as to manage a file system and a user interface that is navigable by a user of the computing device 102. An example of this is illustrated as a launcher module 118 that is representative of functionality to implement an application launcher 120 (e.g., start screen or start menu), an example of which is displayed in a user interface on the display device 108 of the computing device 102 in FIG. 1.

The application launcher 120 includes representations of a plurality of the applications 114, such as icon, tiles, textual descriptions, and so on, and may be configured in a variety of ways. The application launcher 120, for instance, may be configured as a root level of a hierarchical file structure, e.g., each of the other levels are "beneath" the root level in the hierarchy. The representations shown in the illustrated example are selectable to launch a corresponding one of applications 114 for execution on the computing device 102. In this way, a user may readily navigate through a file structure and initiate execution of applications 114 of interest. Other configurations are also contemplated, examples of which are discussed in the following and shown in corresponding figures.

The operating system 116 is also illustrated as including a representation module 122. The representation module 122 is representative of functionality to manage representations of applications 114 (e.g., tiles, icons, and so on) and content consumable by the applications 114, examples of which are illustrated for the start screen. In some instance, the representations may include notifications that may be displayed as part of the representations without launching the represented applications 114. This functionality is illustrated as a notification module 124 that is configured to manage notifications 126 for inclusion as part of the representations.

For example, a representation 128 of a weather application is illustrated as including a notification that indicates a name and current weather conditions, e.g., "72°." In this way, a user may readily view information relating to the applications 114 without having to launch and navigate through each of the applications. Although representations of specific applications 114 are shown, other representations of applications are also contemplated, such as a representation of an application that references a user's involvement with a service, e.g., a friend in a social network service.

In one or more implementations, the notifications 126 may be managed without executing the corresponding applications 114. For example, the notification module 124 may receive the notifications 126 from a variety of different sources, such as from software (e.g., other applications executed by the computing device 102), from a web service 132 via a network 134, and so on. This may be performed responsive to registration of the applications 114 with the notification module 124 to specify where and how notifications are to be received. The notification module 124 may then manage how the notifications 126 are displayed as part of the representations without executing the applications 114. This may be used to improve battery life and performance of the computing device 102 by not running each of the applications 114 to output the notifications 126.

Although this discussion described incorporation of the notification module 124 at the client, functionality of the notification module 124 may be implemented in a variety of ways. For example, functionality of a notification module 124 may be incorporated by the web service 132 in whole or in part. The notification module 130, for instance, may process notifications received from other web services and manage the notifications for distribution to the computing device 102 over the network 134, e.g., through registration of the applications 114 with the notification module 124, 130 such that the notifications 126 may be output as part of the representations without execution the represented applications 114.

The application launcher 120 may be configured in a variety of different ways. In the illustrated example, for instance, the application launcher 120 is configured for interaction in a consumptive usage context. In this context, the application launcher 120 is configured to support manual interaction, such as gestures input by the user's hand 106 in a handheld setting. As such, the application launcher 120 is sized in a substantially full screen view in which a majority of an available display area of the display device 108 is utilized by the application launcher 120 to display representations of applications 114 and other functionality of the computing device 102. Representations included in the application launcher 120 are also sized to be efficiently selectable by a finger of the user's hand 106.

Output of the application launcher 120 may be initiated in a variety of ways. In the illustrated example, for instance, a taskbar 136 (e.g., a quick launch bar) is displayed along an edge of a user interface display on the display device 108. The taskbar 136 includes representations of functionality, including a representation 138 of the application launcher 120. Selection of the representation 138 of the application launcher 120 causes the launcher module 118 to display the application launcher 120 in the user interface. The taskbar 136 may also be configured to include representations of applications 114 that are currently being executed (e.g., whether actively or in a sleep state) by the computing device 102.

Figure 2:
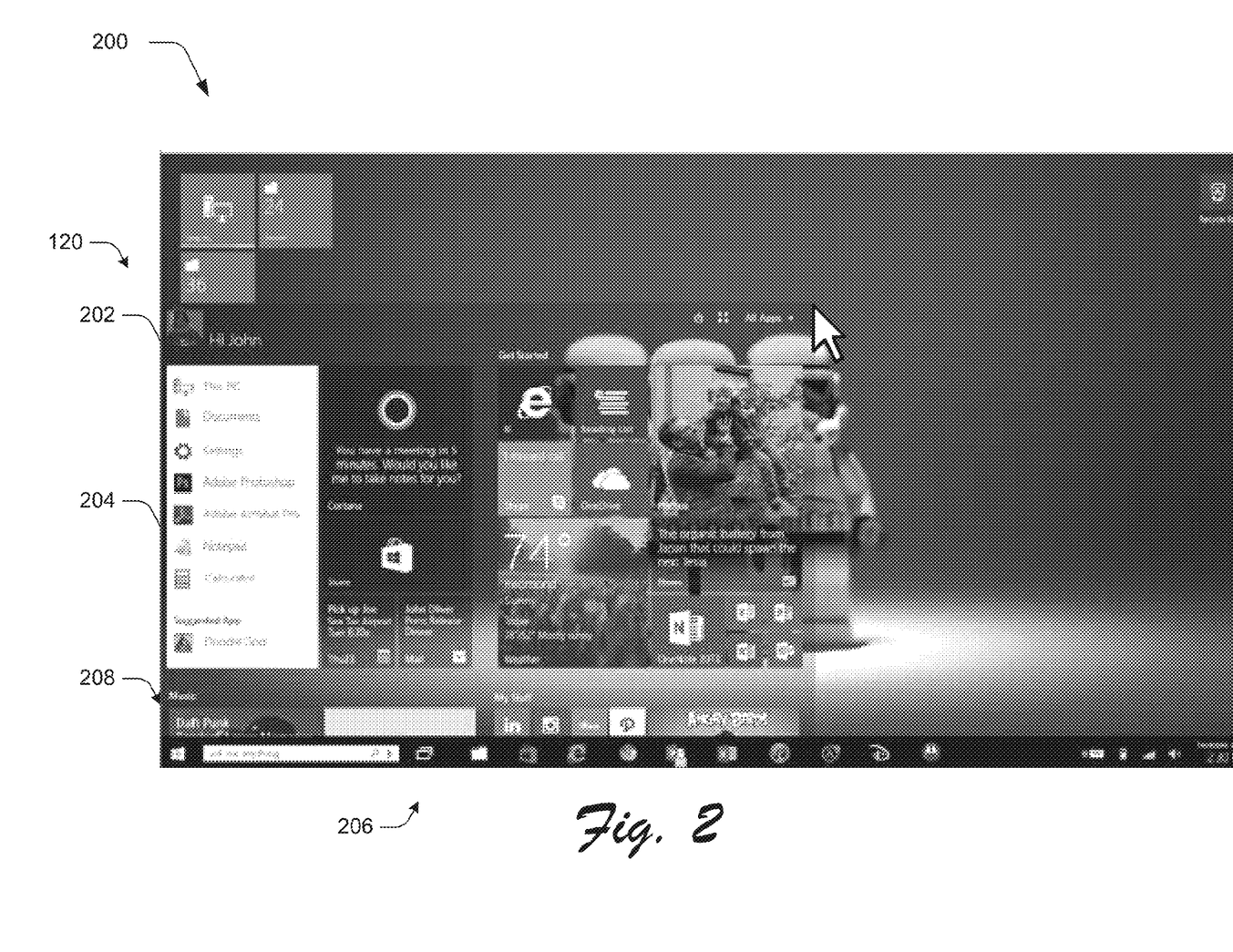
FIG. 2 depicts an example implementation showing an application launcher of FIG. 1 as configured for use in a productive usage context.

FIG. 2 depicts an example implementation 200 showing the application launcher 120 as configured for use in a productive usage context. As illustrated, an overall size of the application launcher 120 is smaller in the productive usage context than in the consumptive usage context of FIG. 1. Representations of the applications 114 also have a smaller display size. In this way, areas around the application launcher 120 are still viewable by a user. For example, user interfaces of applications 114 may be displayed in a layer below the application launcher 120, the application launcher may include translucent portions such that portions of the application user interfaces are viewable through the application launcher 120 (as well as a background image as illustrated), and so forth.

The application launcher 120 includes a chrome area 202. The chrome area 202 includes a user's name as well as functionality that is selectable to turn the computing device 102 "off" and an "all apps" function to navigate to user interface that includes representations of all applications 114 that are available on the computing device 102.

The application launcher 120 also includes a multifunction utility (MFU) 204 area that includes representations of functionality that is selectable via the user interface of the computing device 102 (e.g., "this PC"), view documents, access a settings menu, a calculator application, and so on. Next to the MFU 204 area is a tile grid 206 that includes representations of applications 114 that are configured as tiles in this example although other configurations are also contemplated, such as icons. The tiles include notifications 126 as previously described that may be utilized to notify a user in a non-modal manner within the application launcher 120 without actively executing the represented applications 114.

The representations of the applications 114 are arranged in the tile grid 206 as two columns in this example, and as groups within the columns. A size of the application launcher 120 may be specified in a variety of ways. For example, a user may specify a number of columns or rows for the application launcher 120 in a settings menu that is accessible via "settings" in the MFU 202 area. In another example, a user may interact with a border of the application launcher 120, which is illustrated as being performed using a cursor controlled by a cursor control device to specify a horizontal and vertical size of the application launcher. Other examples are also contemplated, such as through use of a gesture. In a further example, a user may select between different sizes through use of a control (e.g., a button) displayed within the application launcher 120, e.g., to switch between the views shown in FIGS. 1 and 2.

Once specified, the launcher module 118 may be configured to "respect" the user's selection in this example. As shown in FIG. 2, for instance, a user has specified the size for the application launcher 120. Once an available display area of the application launcher 120 is consumed (i.e., "full" of representations of applications 114, the application launcher 120 may support scrolling, e.g., continuous (e.g., non-paginated) scrolling "downward" in this example as indicated by the partial display 208 of tiles. Dynamic sizing of the application launcher 120 may be performed in a variety of ways by the launcher module 118, an example of which is described as follows and shown in corresponding figures.

Figure 3:
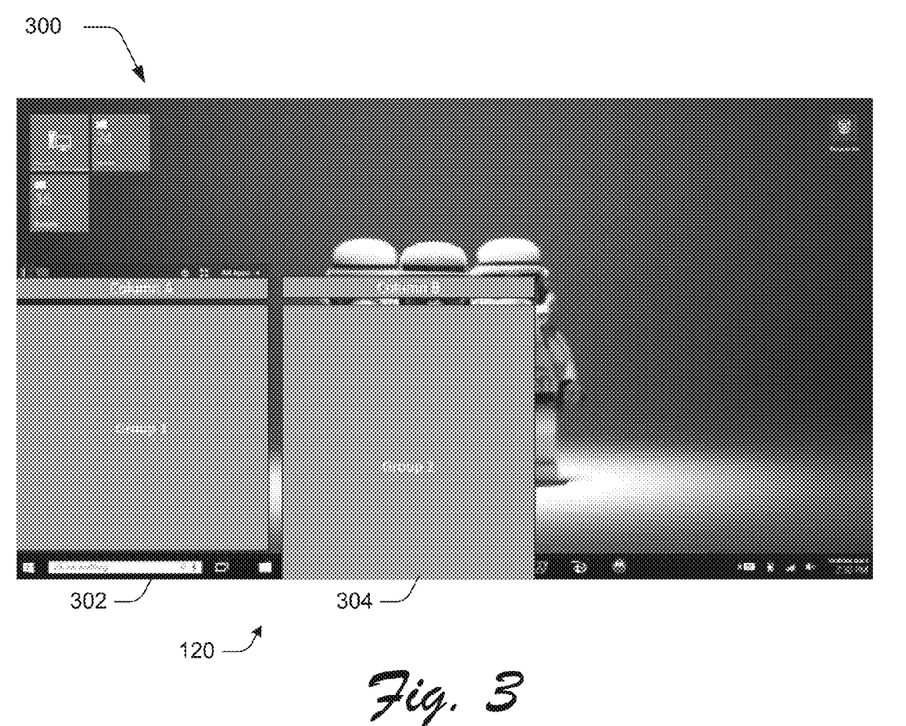
FIG. 3 depicts an example implementation showing the application launcher of FIG. 2 as supporting two columns.

FIG. 3 depicts an example implementation 300 showing the application launcher 120 of FIG. 2 as supporting two columns. This is an example of the configuration of the application launcher 120 in the productive usage as shown in FIG. 2. The application launcher 120 includes first and second columns 302, 304 having a gap between the columns to differentiate them from each other. The first and second columns 302, 304 may also support grouping of representations of applications 114 and content related to the applications, an example of which is described in the following.

Figure 4:
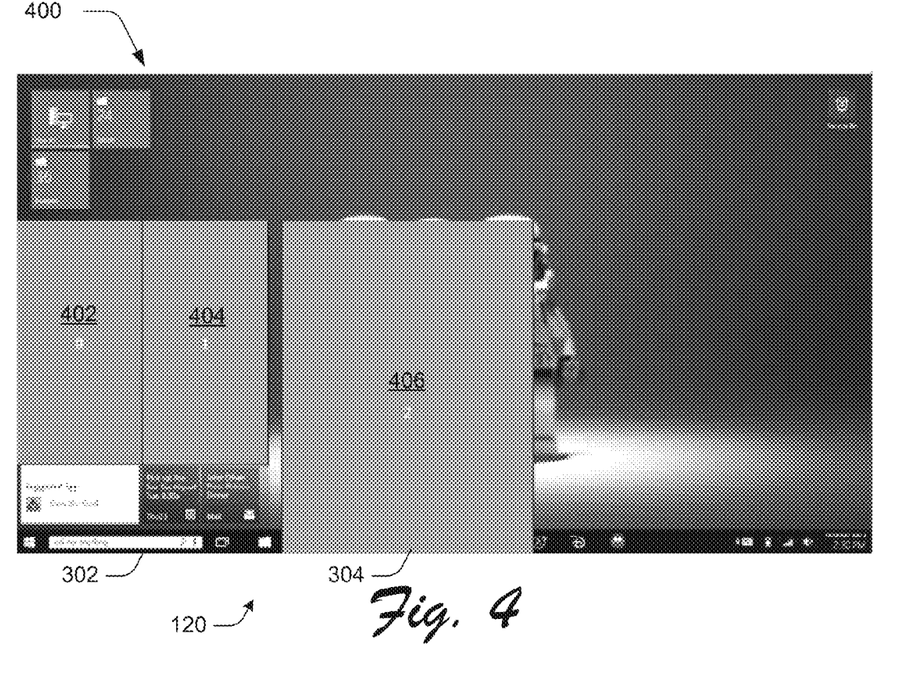
FIG. 4 depicts an example implementation showing the application launcher of FIG. 3 as supporting grouping within the columns.

FIG. 4 depicts an example implementation 400 showing the application launcher 120 of FIG. 3 as supporting grouping within the columns. In this example, the first column 302 includes first and second groups 402, 404 of representations. The second column 304 includes a single group 406 of representations. This layout may be leveraged by the launcher module 118 to dynamically size the application launcher 120 as well as arrange tiles within the application launcher, such as to dynamically resize the application launcher 120 automatically and without user intervention as representations are added to or removed from the application launcher 120.

Figure 5:
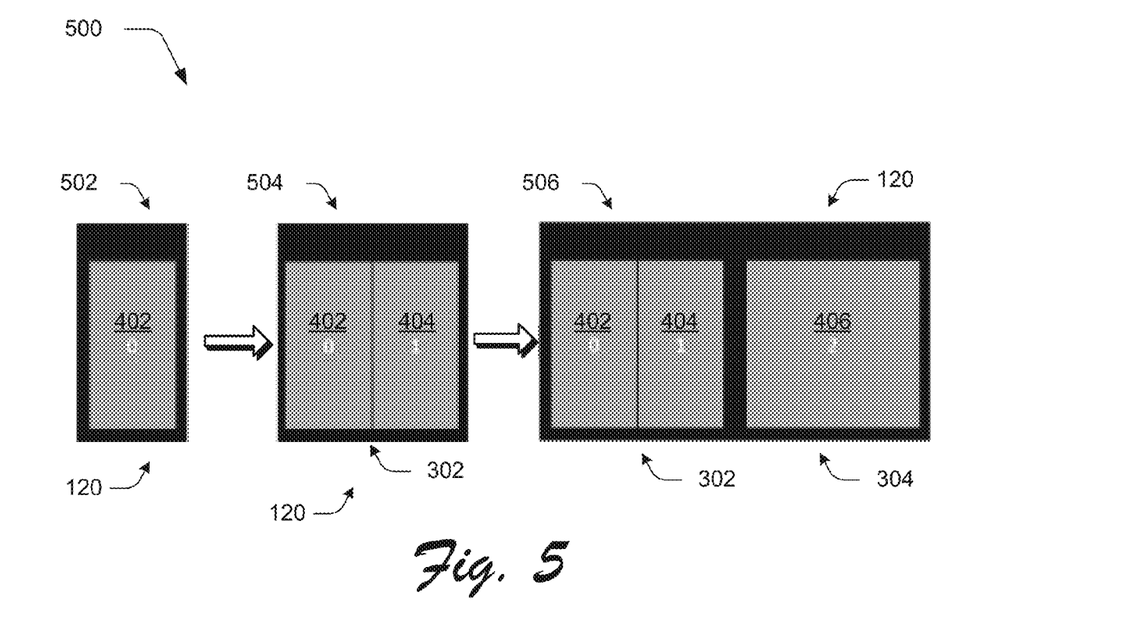
FIGS. 5 and 6 depict example implementations showing dynamic sizing of the application launcher as leveraging the groups of FIG. 4 in a two column format.
Figure 6:
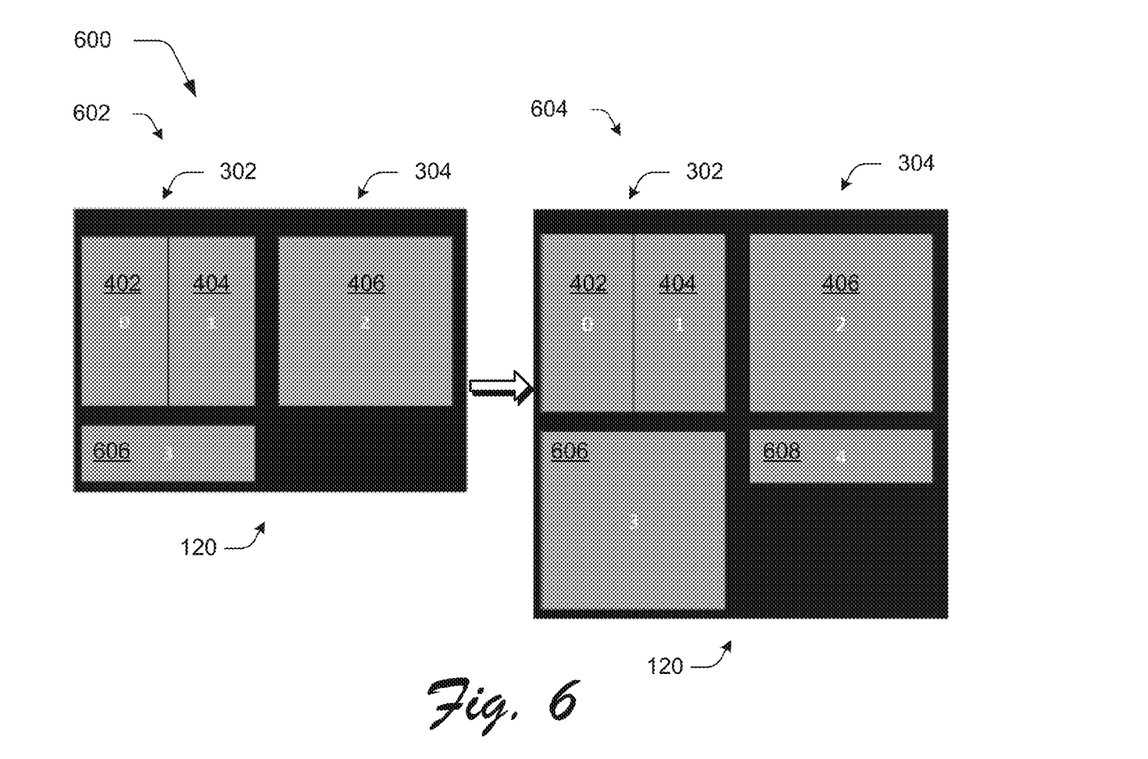

FIGS. 5 and 6 depict example implementations 500, 600 showing dynamic sizing of the application launcher 120 leveraging the groups of FIG. 4 in a two column format. Representations, such as tiles, may be added to or removed from an application launcher 120 in a variety of ways. A user, for instance, may "right click" or perform a gesture (e.g., "slide down" over the tile) in a user interface to cause the application launcher 118 to add the representation to the application launcher 120 as well as remove the representation from the application launcher 120. Thus, although the following describes an example in which representations are added and the application launcher 120 is successively grown this order may be reversed to also describe removal of the representations from the application launcher 120.

The example implementation 500 of FIG. 5 is illustrated as including first, second, and third stages 502, 504, 506. At the first stage 502, representations are added to the first group 402. Once this group is full, a second group 404 is added to the first group 402 within a single column in the application launcher 120, thereby increasing an overall size of the application launcher 120, e.g., an amount of available display area of the display device 108 that is consumed in displaying the application launcher 120.

This process may continue such that once the first and second groups 402, 404 of the first column 302 are filled, a second column 304 is added having a single group 406 as previously described. Thus, in this example a two-column layout has been specified which is utilized to arrange representations within the application launcher 120. This process may continue such that successive representations added to the application launcher 120 are added as groups within these columns.

As shown in the first and second stages 602, 604 of FIG. 6, for instance, once the first, second, and third groups 402, 404, and 406 are filled, a fourth group 606 is added below the first and second groups 402, 404 within the first column 302. Likewise, once the fourth group 606 is filled, a fifth group 608 is added in the second column 304 below the third group 406. This process may continue such that as previously described once an available display area of the application launcher 120 is consumed scrolling functionality may be utilized to navigate through the representations.

Figure 7:
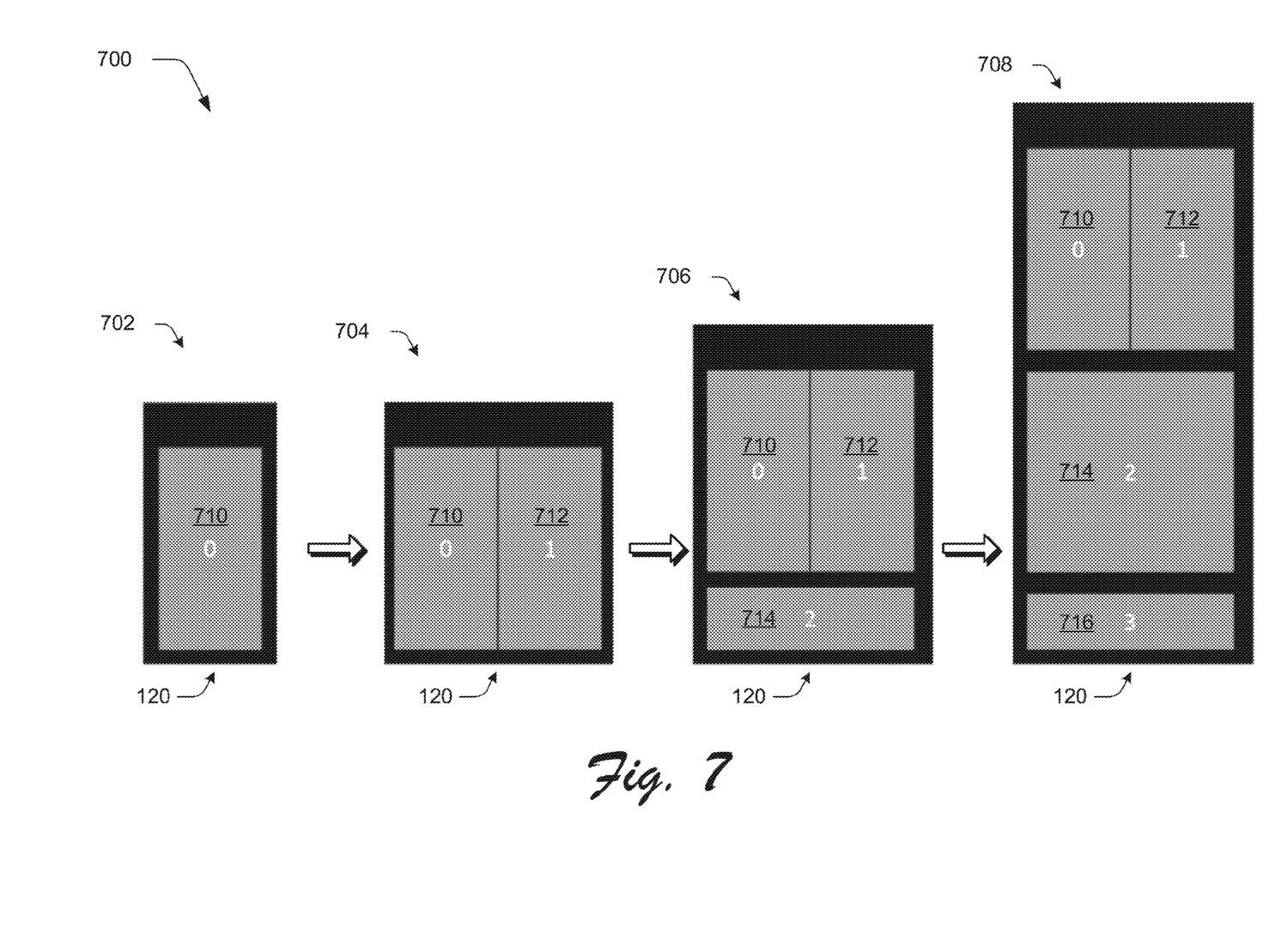
FIG. 7 depicts an example implementation showing the application launcher of FIG. 1 as supporting grouping within a single column.

FIG. 7 depicts an example implementation 700 showing the application launcher 120 of FIG. 1 as supporting grouping within a single column. This example implementation 700 is also illustrated using first, second, third, and fourth stages 702, 704, 706, 708. At the first stage 702, a single vertical group 710 within a single column is used initially to arrange representations of applications 114. This may be utilized to preserve a "compactness" in the display of the application launcher 120 when including few representations.

As before, once this group 710 is filled, a second group 712 may be added to the column as shown in the second stage 704. Subsequent filling of groups may cause additional groups 714, 716 to be added vertically as shown in the third and fourth stages 706, 708, respectively. A variety of other examples are also contemplated, further discussion of which follows and is shown in a corresponding figure.

Figure 8:
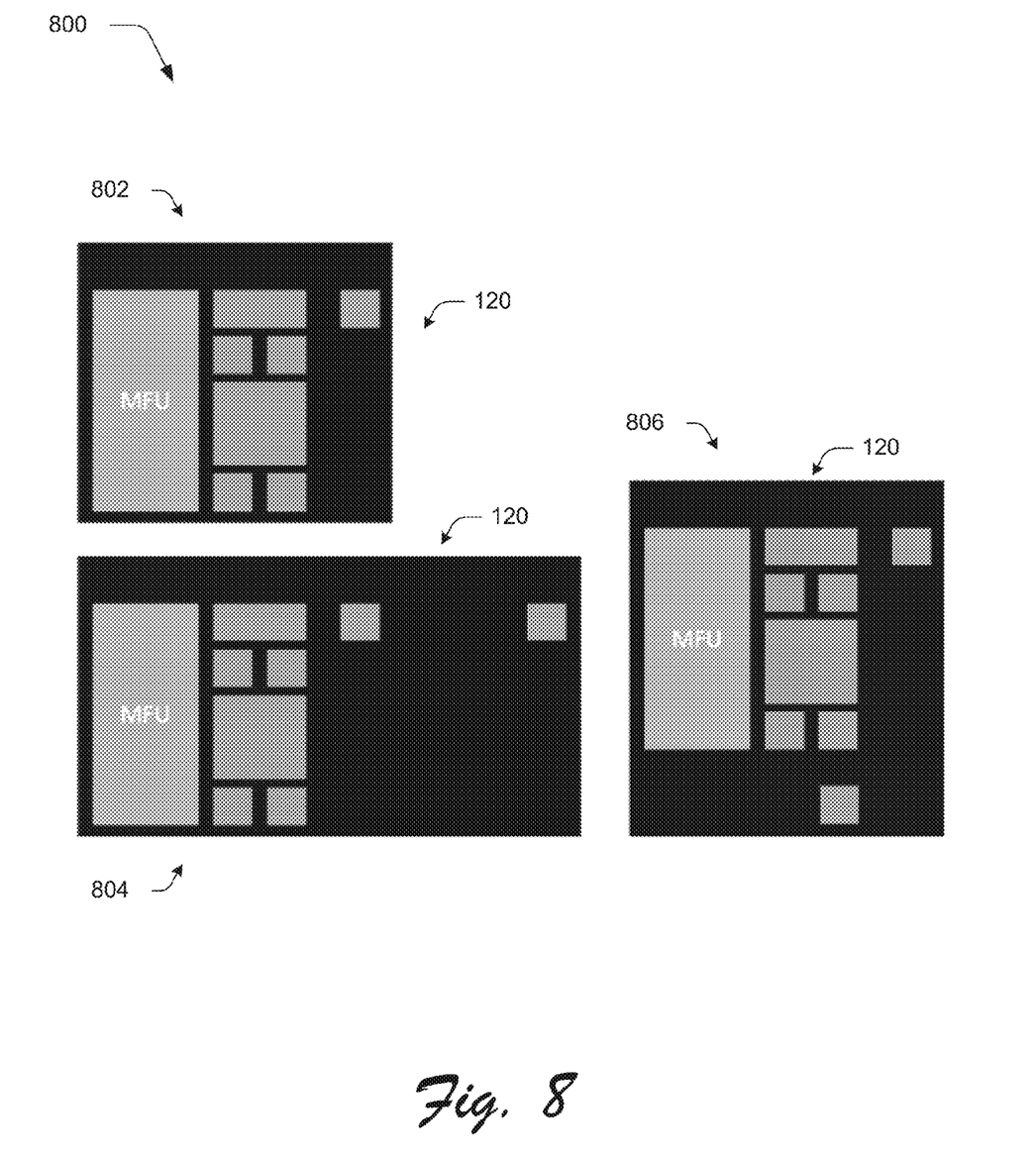
FIG. 8 depicts an example implementation showing additional formats that may be employed by the application launcher of FIG. 1.

FIG. 8 depicts an example implementation 800 showing additional formats that may be employed by the application launcher 120 of FIG. 1. In a first example 802, a three column format is shown. A second example 804 shows expansion from the three column format of the first example 802 into a four column format. A third example 806 shows a three column arrangement in which representations are added to a third column and beneath a second column. Thus, a variety of different layouts may be employed by the launcher module 118 in dynamically sizing the application launcher 120 based on a number of representations to be included in the launcher. As previously described, the launcher module 120 may also dynamically size the application launcher 120 based on a usage context, an example of which is described as follows and shown in a corresponding figure.

Figure 9:
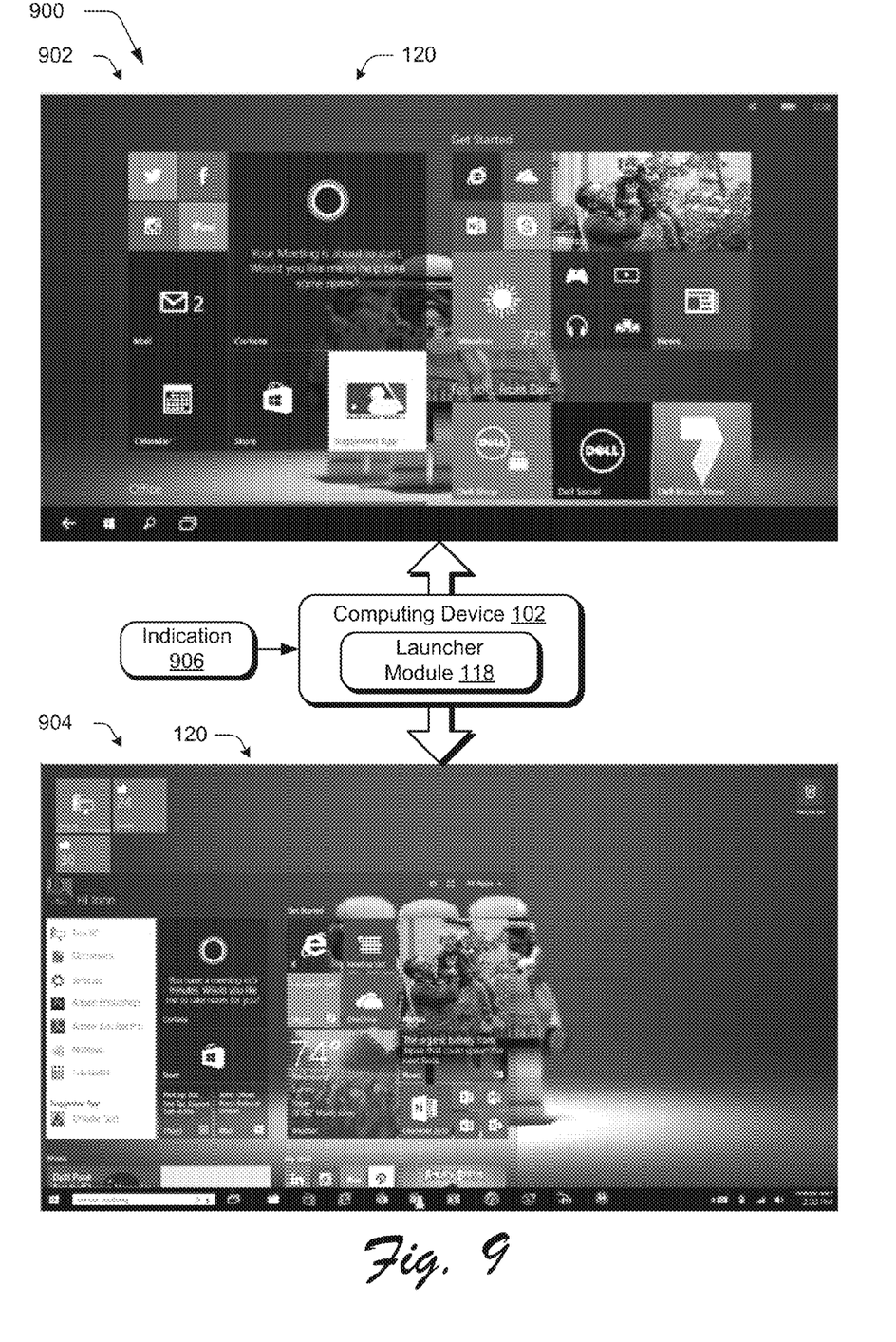
FIG. 9 depicts an example implementation in which a launcher module of the computing device of FIG. 1 dynamically sizes the application launcher responsive to an indication of a usage context of a user in interacting with the computing device.

FIG. 9 depicts an example implementation 900 in which a launcher module 118 of the computing device 102 of FIG. 1 dynamically sizes the application launcher responsive to an indication of a usage context of a user in interacting with the computing device 102. This example implementation includes first and second examples 902, 904 of the application launcher 120.

In the first example 902, the application launcher 120 is configured for a consumptive usage context, such as to be utilized while a user is holding the device to support touch interaction with the user interface, primarily. As such, the application launcher 120 in the first example 902 is illustrated in a substantially full-screen view in which the launcher is given primacy in the user interface (display in the center) and consumes a majority of an available display area of the user interface. The representations (e.g., tiles) are also configured to have a size that support user selection via a gesture input via a finger of the user's hand 106.

In the second example 904, a productive usage context configuration of the application launcher is shown. As illustrated, an overall size of the application launcher 120 is smaller in this example 904 than in the example 902 of the consumptive usage context. Representations of the applications 114 also have a smaller display size. In this way, areas around the application launcher 120 are still viewable by a user as previously described.

The launcher module 118 is configured in this example to dynamically size the application launcher 120 based on an indication 906 of a likely usage context of a user in interacting with the computing device. This indication 906 may be generated in a variety of ways. For example, a size of an available display area of a display device 108 used to output the user interface may be indicative of a likely usage context. A user interacting with a twelve inch screen, for instance, is likely interacting in a consumptive usage context whereas a user interacting with a thirty inch screen is likely interacting an a productive usage context, e.g., at a desktop. Further, functionality supported by the display device 108 may also be indicative. For instance, a lack of touchscreen support by the display device 108 may indicate interaction in a productive usage context.

In another example, the indication 906 may be generated based on orientation or movement of the computing device itself in three-dimensional space. For instance, accelerometers and so on may be utilized to determine whether the computing device 102 has exhibited movement and if so, a user is likely interacting with the computing device 102 in a consumptive usage context whereas lack of movement may indicate a productive usage context. Additionally, an orientation of the computing device 102 in three-dimensional space may indicate whether the user is likely holding the device and therefore interacting in a consumptive user experience or resting the device on a surface (e.g., using a kickstand) and therefore likely interacting in a productive usage context. Use of peripheral devices may also be indicative of a usage context, further discussion of which may be found in the following and shown in a corresponding figure.

Figure 10:
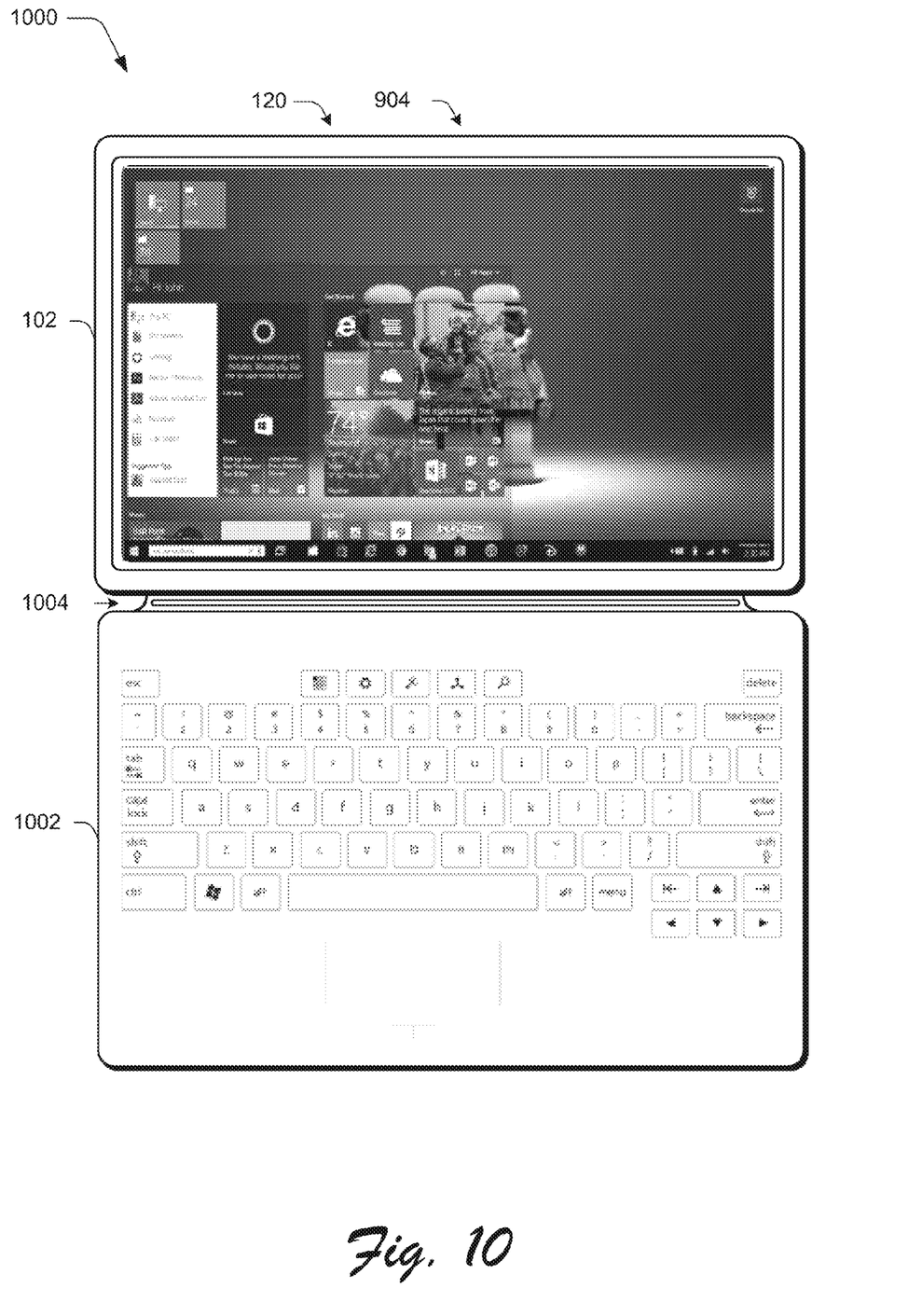
FIG. 10 depicts an example implementation showing a peripheral device as attached to the computing device and as such is indicative of a likely productive usage context.

FIG. 10 depicts an example implementation 1000 showing a peripheral device as attached to the computing device and as such is indicative of a likely productive usage context. In this example, a peripheral device 1002 configured as a keyboard includes a connection portion 1004 that is configured to be removably attachable to the computing device 102 using one or more hands 106 of a user. The connection portion 1004, for instance, may include magnets and physical contacts to support a physical and communicative coupling that may be efficiently attached and removed from the computing device 102.

As such, the launcher module 118 may leverage attachment of the peripheral device 1002 as an indication 906 that a user is to interact with the computing device 102 in a productive usage context and therefore cause output of the example 904 of the application launcher 120 that is configured for this context. Once the peripheral device 1002 is detached form the computing device 102, the launcher module 118 may cause output of the first example 902 of the application launcher 120 configured for a consumptive usage context as shown in FIG. 9. Other examples are also contemplated, such as through use a cursor control device (e.g., connection of a mouse wirelessly to the computing device 102) to indicate interaction via a productive usage context versus interaction with the fingers of the user's hand as indicating a consumptive usage context.

Orientation of a device (e.g., the peripheral device 1002) in relation to the computing device 102 may also be indicative of a likely usage context. The peripheral device 1002 in this example, for instance, is configured to support rotational movement in relation to the computing device 102 through use of a hinge, e.g., a flexible fabric hinge. In this way, the peripheral device 1002 may act as a cover for the display device for storage, may be positioned in a typing configuration that is indicative of a productive usage context, and may even be positioned behind a housing of the computing device 102 to support a consumptive usage context such that the peripheral device 1002 does not interfere with a user's interaction with the computing device 102 in such an instance. These orientations may be detected in a variety of ways, such as through use of sensors in the peripheral device 1002 and/or the computing device 102. Thus, as previously described the launcher module 118 may receive a variety of indications 906 of a likely usage context, which may then be used to dynamically size the application launcher 120. As should be readily apparent, combinations of these techniques may also be utilized by the launcher module 118, which may be used to increase a likely accuracy of the determination. Further discussion of these and other techniques may be found in relation to the following procedures.

Example Procedures

The following discussion describes application launcher sizing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment described above.

Figure 11:
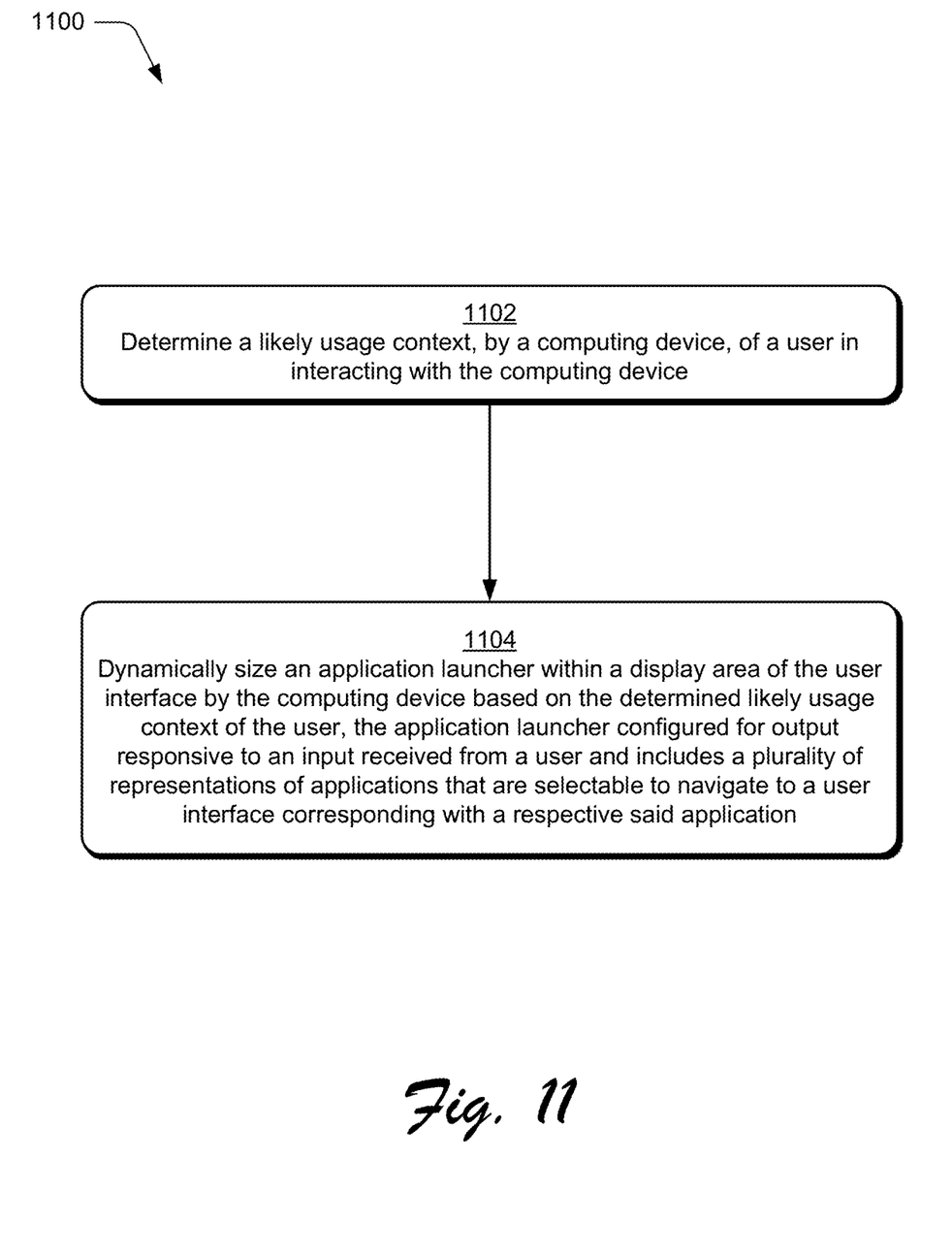
FIG. 11 is a flow diagram depicting a procedure in an example implementation in which a determination of a likely usage context is utilized as a basis to dynamically size an application launcher.

FIG. 11 depicts a procedure 1100 in an example implementation in which a determination of a likely usage context is utilized as a basis to dynamically size an application launcher. A likely usage context is determined, by a computing device, of a user in interacting with the computing device (block 1102). The usage context, for instance, may be based on attachment of a peripheral device to the computing device, physical arrangement of a peripheral device in relation to the computing device, orientation or movement of the computing device in three-dimensional space, size of the display area of a display device that is used to display the user interface, and so on as previously described.

An application launcher is dynamically sized within a display area of the user interface by the computing device based on the determined likely usage context of the user. The application launcher is configured for output responsive to an input received from a user and includes a plurality of representations of applications that are selectable to navigate to a user interface corresponding with a respective application (block 1104). For example, determination of a productive or consumptive usage context may be leveraged to size the application launcher 102 a productive or consumptive usage as previously described in relation to FIG. 9. A variety of other examples are also contemplated.

Example System and Device

FIG. 12 illustrates an example system generally at 1200 that includes an example computing device 1202 that is representative of one or more computing systems and/or devices that may implement the various techniques described herein, which is illustrated through inclusion of the representation module 120. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. This functionality may also be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining a likely usage context, by a computing device, of a user in interacting with the computing device, wherein the determining of the likely usage context comprises:
   when the computing device is configured to support user interaction using gestures via a touchscreen of the computing device, selecting a content consumption context as the likely usage context; and
   when the computing device is configured to support user interaction using a cursor control peripheral device or keyboard, selecting a productivity usage context as the likely usage context; and
   dynamically sizing an application launcher within a display area of the user interface by the computing device based on the determined likely usage context of the user, wherein the application launcher is:
   configured for output responsive to an input received from a user; and
   including a plurality of representations of applications that are selectable to navigate to a user interface corresponding with a respective said application.

2. A method as described in claim 1, wherein the application launcher is configured as a home screen at a root level of a file hierarchy managed by an operating system of the computing device, the home screen being continuously scrollable by a user.

3. A method as described in claim 1, wherein the application launcher is configured to include one or more representations of functions of the computing device.

4. A method as described in claim 1, wherein the application launcher is configured for output responsive to the input received from a user that involves selection of a representation of the application launcher in a taskbar.

5. A method as described in claim 1, wherein the application launcher is configured for display as a layer over one or more user interfaces of applications that are executable by the computing device, the application launcher viewable concurrently with the one or more user interfaces.

6. A method as described in claim 1, wherein at least one of the representations of the applications are configured to display notifications associated with respective said applications without launching the respective said applications.

7. A method as described in claim 1, wherein the dynamically sizing of the application launcher includes dynamically sizing a size of the plurality of representations.

8. A method as described in claim 1, wherein the determining is based on attachment of a peripheral device to the computing device, physical arrangement of another device in relation to the computing device, orientation or movement of the computing device in three-dimensional space, or size of the display area of a display device that is used to display the user interface.

9. A method as described in claim 1, wherein the application launcher is managed as part of an operating system of the computing device.

10. A computing device comprising:
a display device having an available display area to display a user interface; and
one or more modules implemented at least partially in hardware, the one or more modules configured to expose an application launcher configured to:
determine a likely usage context of a user in interacting with the computing device, wherein determining the likely usage context comprises:
when the computing device is configured to support user interaction using gestures via a touchscreen of the computing device, selecting a content consumption context as the likely usage context;
when the computing device is configured to support user interaction using a cursor control peripheral device or keyboard, selecting a productivity usage context as the likely usage context; and
dynamically size the application launcher within the display area of the user interface based on the determined likely usage context of the user, wherein the application launcher is dynamically resizable in both horizontal and vertical directions within the display area of the display device;
wherein the application launcher includes a plurality of representations of applications that are selectable to navigate to a user interface corresponding with a respective said application.

11. A computing device as described in claim 10, wherein the application launcher is dynamically resizable in both horizontal and vertical directions automatically and without user intervention by the one or more modules responsive to receipt of a user input to add or remove at least one of the plurality of representations of applications.

12. A computing device as described in claim 11, wherein the user input is a pinning or unpinning operation.

13. A computing device as described in claim 10, wherein at least one of the representations of the applications are configured to display notifications associated with respective said applications without launching the respective said applications.

14. A computing device as described in claim 10, wherein a user input specifies a number of rows or columns of groups of the plurality of representations to be included in the application launcher as a basis of the dynamic resizing.

15. A computing device as described in claim 10, wherein a user input is a drag and drop operation involving user interaction with a border of the application launcher to size the application launcher in the horizontal and vertical directions.

16. A computing device as described in claim 10, wherein the dynamic resizing of the application launcher of an operating system is based at least in part on a user's interaction with an application launcher of another operating system.

17. A computing device as described in claim 16, where the other operating system is:
a previous version of the operating system that is executed on the computing device;
executed on another computing device on behalf of a user of the computing device; or
executed on another computing device that is associated with a user of the computing device.

18. A computing device comprising:
a display device;
a processing system; and
memory configured to maintain an operating system that is executable by the processing system to cause output of an application launcher on the display device, the operating system configured to:
determine a likely usage context of a user in interacting with the computing device, wherein determining the likely usage context comprises:
when the computing device is configured to support user interaction using gestures via a touchscreen of the computing device, selecting a content consumption context as the likely usage context; and
when the computing device is configured to support user interaction using a cursor control peripheral device or keyboard, selecting a productivity usage context as the likely usage context;
cause a switch between the content consumption context of the application launcher and the productivity usage context of the application launcher responsive to determining the likely usage context of the user in interacting with the computing device; and
dynamically size the application launcher within a display area of a user interface by the computing device based on the determined likely usage context of the user.

19. A computing device as described in claim 18, wherein the determining is based on attachment of a peripheral device to the computing device, physical arrangement of a peripheral device in relation to the computing device, orientation or movement of the computing device in three-dimensional space, or size of the display area of a display device that is used to display the user interface.

* * * * *